US012725939B2

(12) United States Patent
Gonzalez et al.

(10) Patent No.: US 12,725,939 B2
(45) Date of Patent: Sep. 1, 2026

(54) DUAL POLARITY ANTENNA

(71) Applicant: HUAWEI TECHNOLOGIES CO., LTD., Shenzhen (CN)

(72) Inventors: Ignacio Gonzalez, Munich (DE); Grzegorz Wolosinski, Munich (DE); Bruno Biscontini, Munich (DE)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 18/959,221

(22) Filed: Nov. 25, 2024

(65) Prior Publication Data

US 2025/0096484 A1 Mar. 20, 2025

Related U.S. Application Data

(63) Continuation of application No. PCT/EP2022/064782, filed on May 31, 2022.

(51) Int. Cl.

| | |
|---|---|
| ***H01Q 21/24*** | (2006.01) |
| ***H01Q 9/04*** | (2006.01) |
| ***H01Q 9/16*** | (2006.01) |
| ***H01Q 9/30*** | (2006.01) |
| ***H01Q 21/00*** | (2006.01) |

(52) U.S. Cl.
CPC ........... *H01Q 21/24* (2013.01); *H01Q 9/0478* (2013.01); *H01Q 9/16* (2013.01); *H01Q 9/30* (2013.01); *H01Q 21/0006* (2013.01)

(58) Field of Classification Search
CPC ........ H01Q 1/521; H01Q 9/0478; H01Q 9/16; H01Q 9/30; H01Q 21/0006; H01Q 21/24; H01Q 21/28; H01Q 21/29; H01Q 25/001
See application file for complete search history.

(56) References Cited

U.S. PATENT DOCUMENTS

| | | | |
|---|---|---|---|
| 6,195,063 | B1 | 2/2001 | Gabriel et al. |
| 7,579,999 | B2 | 8/2009 | Boβet al. |
| 2016/0072196 | A1 | 3/2016 | Boyer |

FOREIGN PATENT DOCUMENTS

| | | | | |
|---|---|---|---|---|
| EP | 1194982 B1 | | 10/2004 | |
| GB | 2512111 A | * | 9/2014 | ........... H01Q 21/205 |

OTHER PUBLICATIONS

Luo et al., "Enhancing cross-polarisation discrimination or axial ratio beamwidth of diagonally dual or circularly polarised base station antennas by using vertical parasitic elements," IET Microwaves, Antennas & Propagation, Jul. 2017, 11(9):1190-1196.

(Continued)

*Primary Examiner* — Hoang V Nguyen
(74) *Attorney, Agent, or Firm* — Fish & Richardson P.C.

(57) ABSTRACT

In some examples, a dual polarity antenna includes a dual polarity radiator. The dual polarity radiator includes a first radiator having a first polarity and a second radiator having a second polarity orthogonal to the first polarity. The dual polarity antenna further includes an ancillary radiator. The dual polarity antenna further includes a feeding network for feeding a radio-frequency (RF) signal to both the first radiator and the ancillary radiator, driving the first radiator to radiate a wave having a first polarisation, causing radiation of a spurious wave having a polarisation orthogonal to the first polarisation, and driving the ancillary radiator to radiate a wave that cancels the spurious wave at least partly.

20 Claims, 6 Drawing Sheets

600

(56) References Cited

OTHER PUBLICATIONS

Luo et al., "A Plus/Minus 45 Degree Dual-Polarized Base-Station Antenna With Enhanced Cross-Polarization Discrimination via Addition of Four Parasitic Elements Placed in a Square Contour," IEEE Transactions on Antennas and Propagation, Apr. 2016, 64(4):1514-1519.
Lee et al., "Compact Broadband Dual-Polarized Antenna for Indoor MIMO Wireless Communication Systems," IEEE Transactions on Antennas and Propagation, Dec. 7, 2015, 64(2):766-770.
Jiang et al., "A Wideband Dual-Polarized Antenna With Enhanced Cross-Polarization Discrimination for Base Station Application," Proceedings of 2020 14th European Conference on Antennas and Propagation (EuCAP), Mar. 15, 2020, 4 pages.
International Search Report and Written Opinion in International Appln. No. PCT/EP2022/064782, mailed on Jan. 23, 2023, 16 pages (with English translation).
Office Action in India Appln. No. 2024-37088352, mailed on Jul. 7, 2026, 7 pages.

* cited by examiner

100

600

700

800

DUAL POLARITY ANTENNA

CROSS-REFERENCE TO RELATED APPLICATIONS

This application is a continuation of International Application No. PCT/EP2022/064782, filed on May 31, 2022, the disclosure of which is hereby incorporated by reference in its entirety.

TECHNICAL FIELD

The present invention relates generally to a dual polarity antenna, an antenna array, and an improved mechanism for reduction of interference generated by cross-polar radiation.

BACKGROUND

Massive multiple-input and multiple-output, mMIMO, is one of the key technologies driving a new generation of mobile communications. However, country specific regulations can be a limiting factor when rolling out new services and telecommunication infrastructures.

For example, in order to facilitate site acquisition and to meet the local regulations concerning site upgrades, the dimensions of new antennas should be comparable to legacy products. Additionally, in order to be able to maintain the mechanical support structures present at the sites, the load placed on the exterior of a new antenna structure by wind should be equivalent or comparable to the wind load of the legacy antennas. These factors lead to a very strict limitation in, e.g., the width of new antennas.

The directivity of an antenna is limited by its aperture, and, consequently, by the antenna width. This effect becomes critical when several antenna arrays are placed inside the same enclosure. Recently, mMIMO arrays have been evolving to enclose more and more radiating elements in the same volume, even for the same frequency band. As the distance between the radiating elements is reduced, element coupling increases, leading to a reduction in antenna efficiency and performance during both transmission and reception of signals. Coupling can be considered interference as it amounts to energy radiated outside of the intended area, thereby degrading network performance.

In order to increase traffic handling capacity of the antenna system, dual polarised antennas may be used. Unfortunately, when coupling between the polarisation increases, for example due to reduction in distance between radiating elements, radiation in the orthogonal direction is generated, which adversely affects the cross-polar discrimination (XPD) of the antenna.

SUMMARY

An objective of the present disclosure is to provide a dual polarity antenna capable of reducing interference generated by cross-polar radiation, thereby improving XPD.

The foregoing and other objectives are achieved by the features of the independent claims.

Further implementation forms are apparent from the dependent claims, the description and the figures.

A first aspect of the present disclosure provides a dual polarity antenna comprising a dual polarity radiator comprising a first radiator having a first polarity and a second radiator having a second polarity orthogonal to the first polarity, an ancillary radiator, and a feeding network for feeding a radio-frequency, RF, signal to both the first radiator and the ancillary radiator, thereby driving the first radiator to radiate a wave having a first polarisation, and causing radiation of a spurious wave having a polarisation orthogonal to the first polarisation, and further driving the ancillary radiator to radiate a wave that cancels the spurious wave at least partly.

Accordingly, the ancillary radiator can be used to cancel (at least partly) the electromagnetic fields generated in the orthogonal polarisation of a dual polarity radiator, thereby reducing the spurious radiation generated in the orthogonal polarization. XPD is thus improved.

In an implementation of the first aspect, the feeding network may comprise one or more delay elements. Thus, the feeding network can define the phase of the RF signal in a simple, cost-effective manner.

The feeding network may be configured so that the RF signal has a lower amplitude at the ancillary radiator than at the first radiator.

The ancillary radiator may comprise two or more monopole antennas. Thus, the complexity of the components constituting the ancillary radiator can be minimised, thereby simplifying manufacturing and reducing costs associated therewith.

The monopole antennas may be placed symmetrically with respect to the dual polarity radiator. Thus, array theory can be utilised to design different monopole configurations and specific pattern shapes to effectively cancel various spurious waves.

The ancillary radiator may be a first ancillary radiator, the feeding network may be a first feeding network, and the dual polarity antenna may further comprise a second ancillary radiator and a second feeding network, wherein the second feeding network is configured for feeding a radio-frequency, RF, signal to both the second radiator and to the second ancillary radiator, thereby driving the second radiator to radiate a wave having a second polarisation and causing generation of a spurious wave having a polarisation orthogonal to the second polarisation, and further driving the second ancillary radiator to radiate a wave that cancels the spurious wave at least partly. Thus, XPD of the dual polarity radiator can be improved effectively.

A second aspect of the present disclosure provides an antenna array comprising a plurality of dual polarity antennas as described herein.

Accordingly, the ancillary radiator can be used to cancel, at least to a degree, the resultant fields generated in the orthogonal polarisation of a dual polarity radiator, thereby reducing interference and improving the XPD. This can be achieved by using the radiation from the ancillary radiator to reduce orthogonal radiation generated by the excitation of the dual polarity radiator. As such, a reduction in interference can be provided.

The plurality of dual polarity antennas may form a massive multiple-input and multiple-output, mMIMO, antenna array. As such, the dual polarity antennas can be utilised in a dense, new generation antenna arrays.

A third aspect of the present disclosure provides a method of transmitting a radio-frequency (RF) signal. The method comprises feeding a radio-frequency, RF, signal to a first radiator having a first polarity and a first ancillary radiator. This drives the first radiator to radiate a wave having a first polarisation and causes radiation of a spurious wave having a polarisation orthogonal to the first polarisation Feeding the RF signal to the first ancillary radiator further drives the first ancillary radiator to radiate a wave that cancels the spurious wave at least partly.

Accordingly, the first ancillary radiator can be used to cancel the resulting fields generated in the orthogonal polarisation of a dual polarity radiator, thereby reducing the interference and improving the XPD.

The RF signal may have a lower amplitude at the ancillary radiator than at the first radiator.

The method may further comprise the steps of feeding a second radio-frequency, RF, signal to a second radiator having a second polarity and a second ancillary radiator to thereby drive the second radiator to radiate a wave having a second polarisation and causing generation of a spurious wave having a polarisation orthogonal to the second polarisation, and driving the second ancillary radiator to radiate a wave that cancels the spurious wave at least partly.

BRIEF DESCRIPTION OF THE FIGURES

Embodiments will now be described by way of example only with reference to the figures, in which.

DETAILED DESCRIPTION

Figure 1:
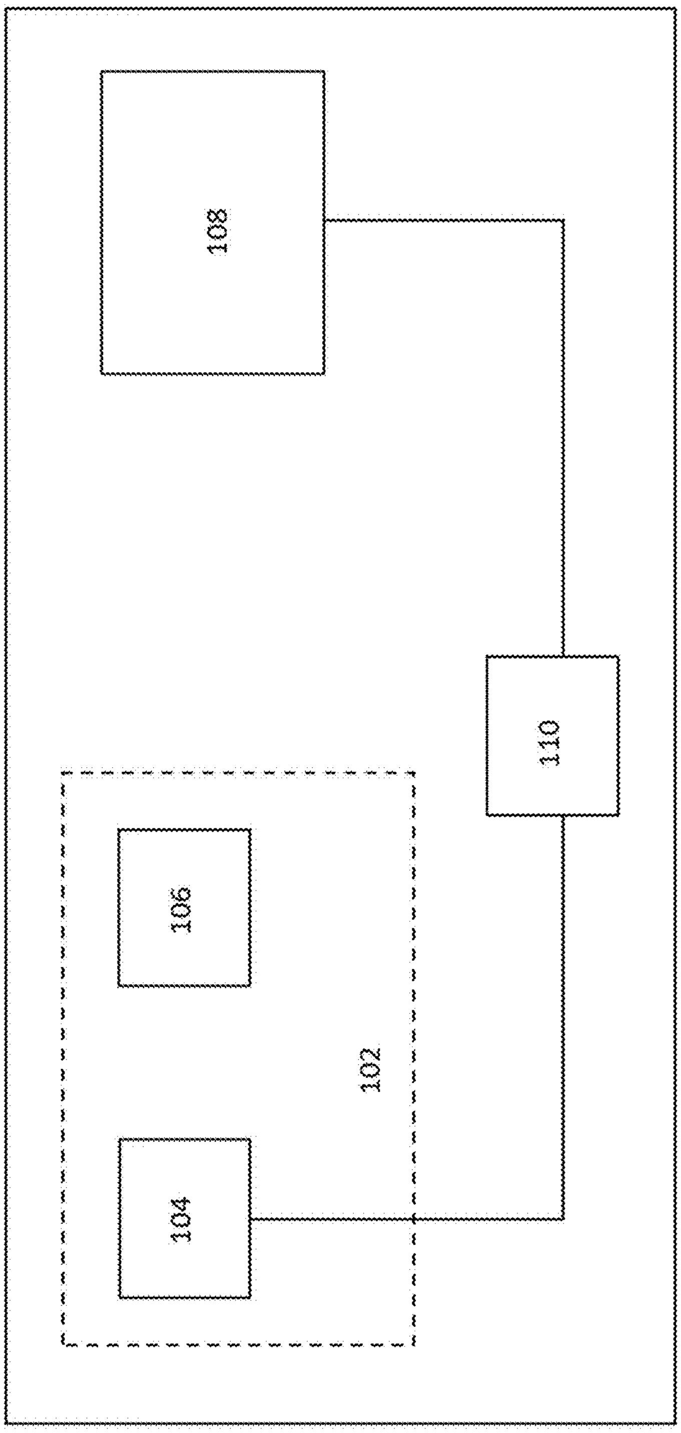
FIG. 1 schematically depicts a dual polarity antenna, in accordance with an example embodiment.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

According to an example, there is provided a dual-polarity antenna with improved polarisation purity between orthogonal polarised signals radiated by the dual-polarity antenna. At least one ancillary radiator is provided to cancel, offset, or reduce the spurious fields generated in the perpendicular polarisation with regard to a desired polarisation, thereby improving cross-polar discrimination (XPD).

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added.

FIG. 1 schematically depicts a dual polarity antenna, in accordance with an example embodiment. The dual polarity antenna 100 comprises a dual polarity radiator 102, comprising a first radiator 104 having a first polarity and a second radiator 106 having a second polarity. The dual polarity antenna 100 further comprises an ancillary radiator 108 and a feeding network 110 for feeding a radio-frequency, RF, signal to both the first radiator 104 and the ancillary radiator 108, thereby driving the first radiator 104 to radiate a wave having a first polarisation, and causing radiation of a spurious (i.e., unwanted or undesirable) wave having a polarisation orthogonal to the first polarisation, and further driving the ancillary radiator 108 to radiate a wave that cancels the spurious wave, at least partly. In other words, the ancillary radiator 108 may radiate a signal such that the cross-polar component radiated by the first radiator 104 is at least partly cancelled out, thereby reducing the interference and improving XPD.

The skilled person would appreciate that the exact hardware components selected to implement the feeding network 110 are not important, as long as the feeding network 110 can provide a signal with set properties of amplitude, frequency, and wave shape. The RF signal fed by the feeding network 110 may be generated internally, e.g., by the components/circuitry constituting the feeding network 110, or externally, such that the feeding network 110 can feed the signal to the required components of the dual polarity antenna 100.

Figure 4:
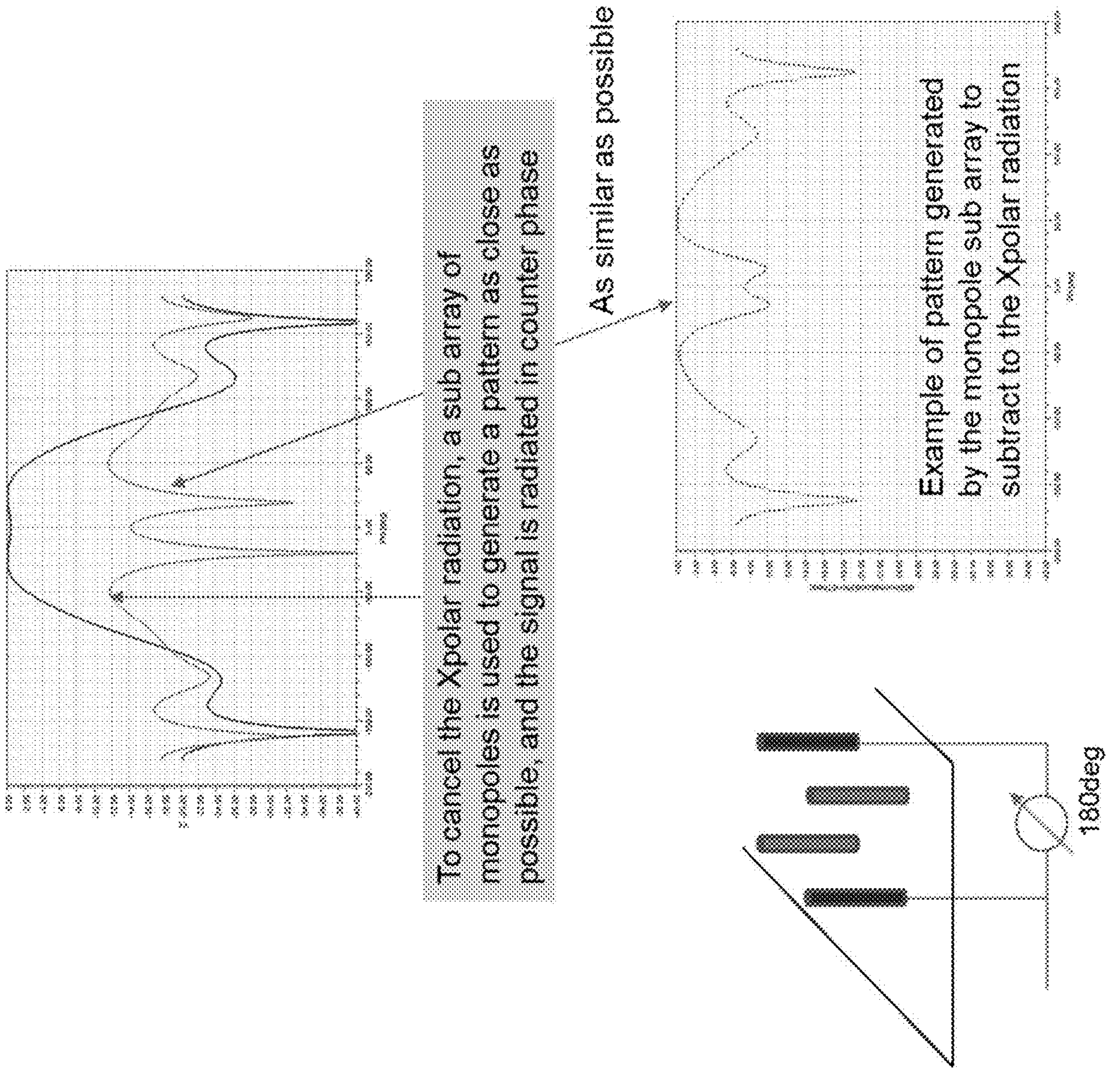
FIG. 4 schematically depicts a pattern cancellation generation, in accordance with an example embodiment.

The feeding network 110 may comprise one or more delay components, so as to delay the signal to be fed to both the first radiator 104 and the ancillary radiator 108, thereby ensuring that the signal of the ancillary radiator 108 is counter phased to the signal of the first radiator 104. This is further illustrated in FIG. 4, which schematically depicts a pattern cancellation generation, in accordance with an example embodiment. To cancel the cross-polar radiation, the ancillary radiator 108 may be used to generate a pattern resembling the cross-polar radiation as closely as possible, and radiate the signal in counter phase so as to at least partly cancel the spurious wave.

In an example, the feeding network 110 may be configured so that the RF signal has a lower amplitude at the ancillary radiator 108 than at the first radiator 104. An amplitude of the RF signal at the ancillary radiator 108 may be tuned to the level of the cross-polarisation generated by the dual polarity radiator 102. A frequency of the signal fed by the feeding network 110 to the first radiator 104 and the ancillary radiator 108 may be the same, or substantially the same, such that both elements may radiate at the same frequency.

In an example, different cross-polar components may be compensated by employing different excitations (phase and amplitude) of the ancillary radiator 108. Generally, a strength of the cross-polar radiation will depend on how strong the element coupling in the antenna is, i.e., how far the radiating elements of an antenna system are with respect to each other. Consequently, signal strength of the RF signal required to be fed by the feeding network 110 to the ancillary radiator 108 may depend on the strength of the cross-polar radiation caused by said coupling.

Figure 2:
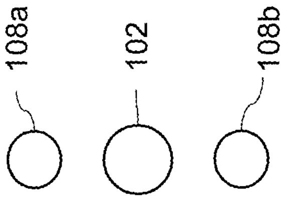
FIG. 2 schematically depicts a top view of a dual polarity antenna, in accordance with an example embodiment.

FIG. 2 schematically depicts a top view of a dual polarity antenna 100, in accordance with an example. In an example, the ancillary radiator 108 may comprise two or more monopole antennas, denoted in FIG. 2 as 108*a* and 108*b*. The skilled person would appreciate that the number of monopole antennas can be varied according to the requirements of the antenna system, and that dipole antennas can be used in place of the monopole antennas. The monopole antennas 108*a*, 108*b* may be placed symmetrically with respect to the dual polarity radiator 102. For example, the monopole antennas 108*a*, 108*b* may be arranged in an array configuration concentrically to the dual polarity radiator 102.

The dual polarity radiator 102 and the ancillary radiator 108 may comprise a common phase centre. The monopole antennas 108*a*, 108*b* may be arranged in a symmetric array configuration with respect to the phase centre.

Referring back to FIG. 1, the ancillary radiator 108 may be a first ancillary radiator, the feeding network 110 may be a first feeding network, and the dual polarity antenna 100 may further comprise a second ancillary radiator and a second feeding network. The second ancillary radiator and the second feeding network may correspond to, or substantially correspond to, the ancillary radiator 108 and the feeding network 110, respectively. The second feeding network may be configured for feeding a radio-frequency, RF, signal to both the second radiator 106 and to the second ancillary radiator, thereby driving the second radiator 106 to radiate a wave having a second polarisation and causing generation of a spurious wave having a polarisation orthogonal to the second polarisation, and further driving the second ancillary radiator to radiate a wave that cancels the spurious wave at least partly.

Figure 3:
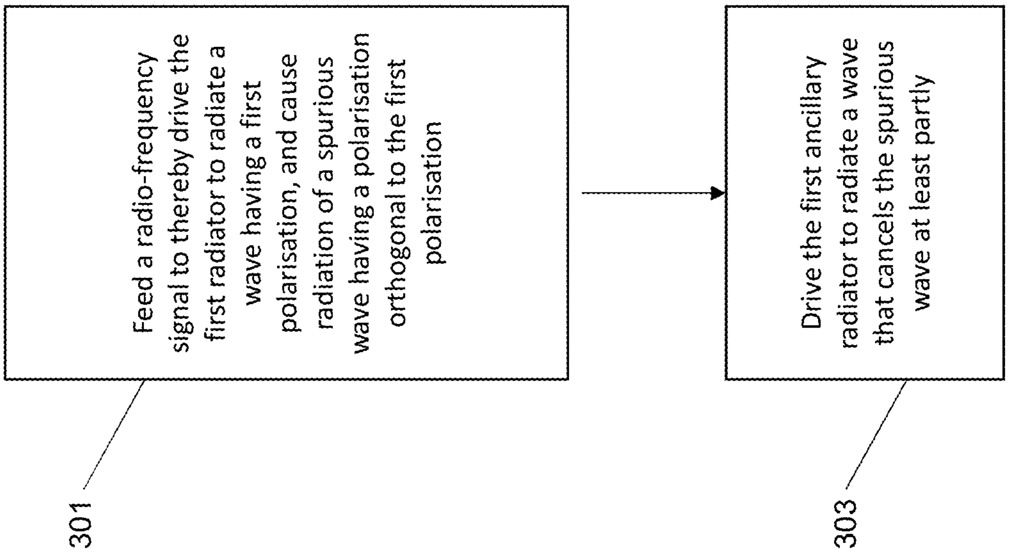
FIG. 3 schematically depicts a method for improving radiated polarisation purity between orthogonal polarised signals in a dual polarity antenna, in accordance with an example embodiment.

FIG. 3 schematically depicts a method for improving radiated polarisation purity between orthogonal polarised signals in a dual polarity antenna, in accordance with an example embodiment. The dual polarity antenna may be, for example, the dual polarity antenna 100 described herein. The method comprises, in block 301, feeding a radio-frequency, RF, signal to a first radiator having a first polarity and a first ancillary radiator to thereby drive the first radiator to radiate a wave having a first polarisation, and causing radiation of a spurious wave having a polarisation orthogonal to the first polarisation. In block 303, the method comprises driving the first ancillary radiator to radiate a wave that cancels the spurious wave at least partly. In other words, the first ancillary radiator can radiate a signal such that the cross-polar component radiated by the first radiator 104 is at least partly cancelled out, thereby reducing the interference generated.

In an example, an improvement in radiated polarisation purity between orthogonal polarised signals in a dual polarity antenna may be achieved by determining a measure of a first field distribution of a first field radiated from a dual polarity radiator of the dual polarity antenna, and generating a second field distribution using an ancillary radiator of the dual polarity antenna, wherein the first field distribution and the second field distribution comprise phase distributions that are out of phase. An amplitude of the signal used to generate the second field distribution may be adjusted such that the resulting spurious (e.g., unwanted or undesirable) radiated power of the first field can be regulated.

The second field distribution may be generated on the basis of a selected configuration for each of multiple radiators of a sub-array forming the ancillary radiator of the dual polarity antenna. The second phase distribution may also be generated on the basis of a selected cross-polar component for the dual polarity antenna.

In an example, a phase value for the first field distribution and the second field distribution may be selected, and the phase of the signal may be adjusted to generate a difference in phase between the first phase distribution and the second phase distribution at the selected phase value representing the predetermined amount. The predetermined amount may be 180 degrees.

Figure 5:
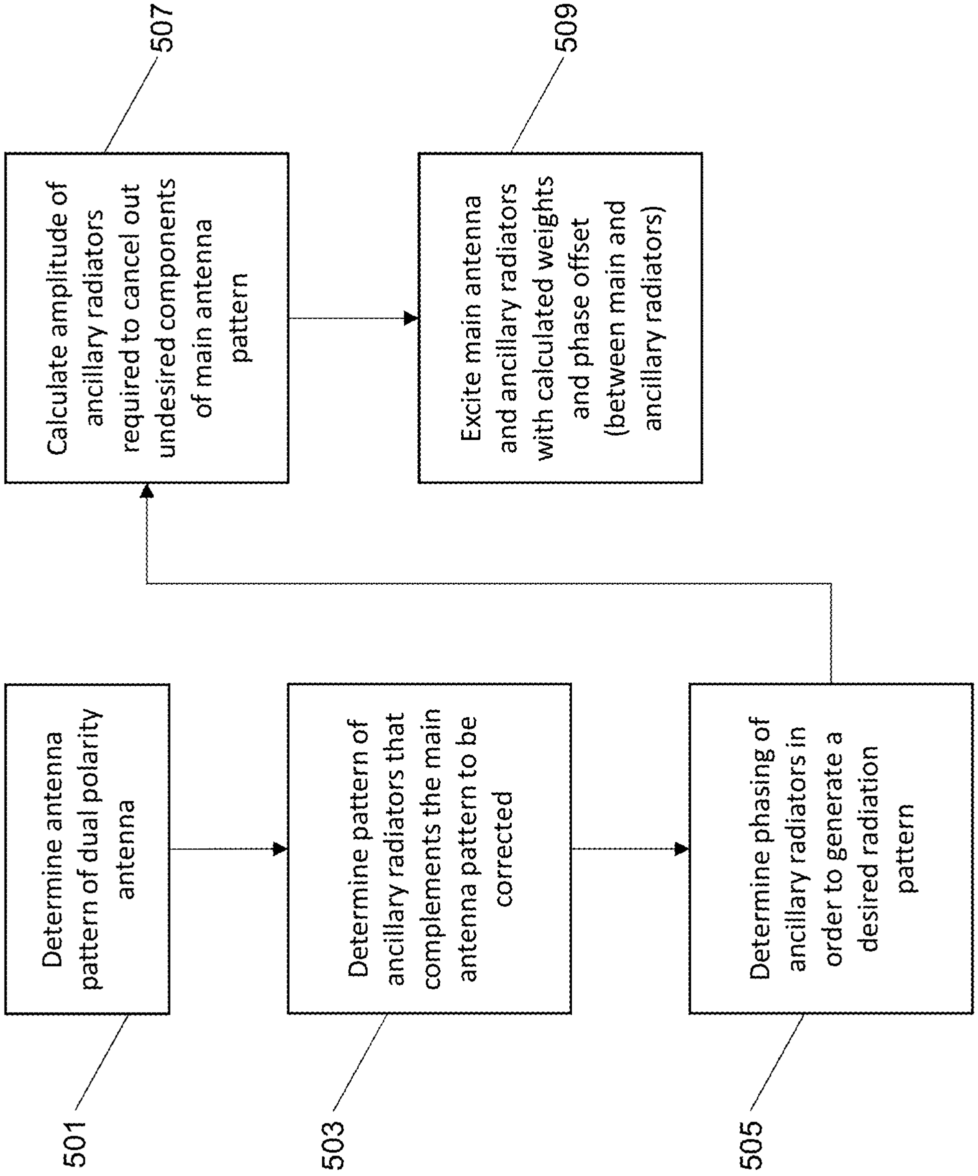
FIG. 5 schematically depicts a method, in accordance with an example embodiment.

FIG. 5 is a flowchart of a method, in accordance with an example embodiment. In block 501, the antenna pattern of a dual polarity antenna is determined. The antenna pattern represents a measure of the directivity of the dual polarity antenna (in dB) as a function of phase and provides information for both the main antenna pattern as well as that of undesired components. In an example, the antenna pattern is determined in the environment in which the antenna is to be used. In block 503, a pattern of ancillary radiators is determined that complements the main antenna pattern to be corrected. In an example, an ancillary radiator can comprise a monopole or a dipole antenna. In block 505, the phasing of the ancillary radiators is calculated in order to generate a desired radiation pattern. In an example, the desired radiation pattern can comprise a radiation pattern with substantially the same components as that of the undesired polarization. In block 507, the amplitude of the ancillary radiators that is required to cancel out the undesired components of the main antenna pattern is calculated, and in block 509, the main antenna and the ancillary radiators can be excited with the calculated weights and a phase offset (between the main and the ancillary radiators). In an example, the phase offset is such that the components to be cancelled from the main antenna are in counter-phase with the ones from the ancillary radiators.

Figure 6:
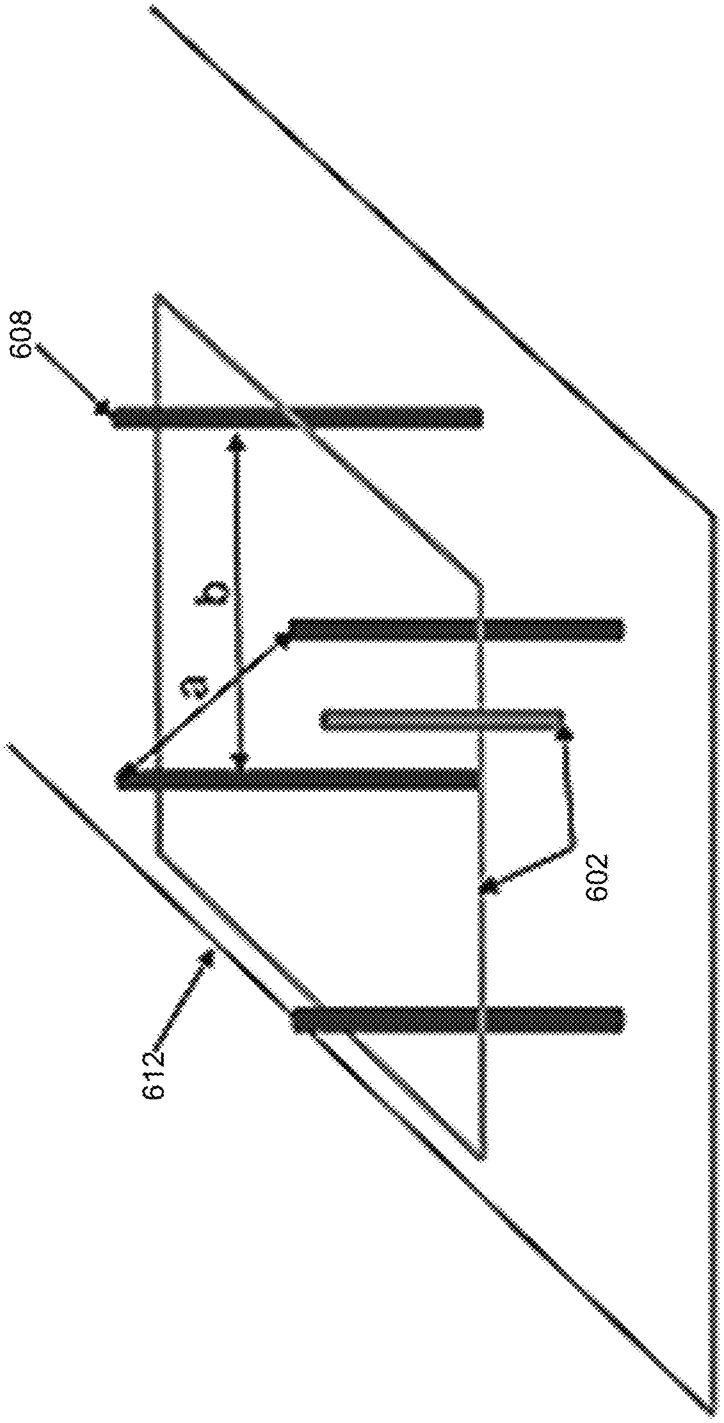
FIG. 6 schematically depicts a dual polarity antenna, in accordance with an example embodiment.

FIG. 6 schematically depicts a dual polarity antenna, in accordance with an example embodiment. The dual polarity antenna 600 corresponds to the dual polarity antenna 100 of FIG. 1. The antenna 600 comprises a dual polarity radiator 602 and an ancillary radiator 608, as well as ground 612. The distances a and b between monopoles of the ancillary radiator may be selected using array factor theory, whereby to shape a signal to be used to cancel an unwanted orthogonal field.

Figure 7:
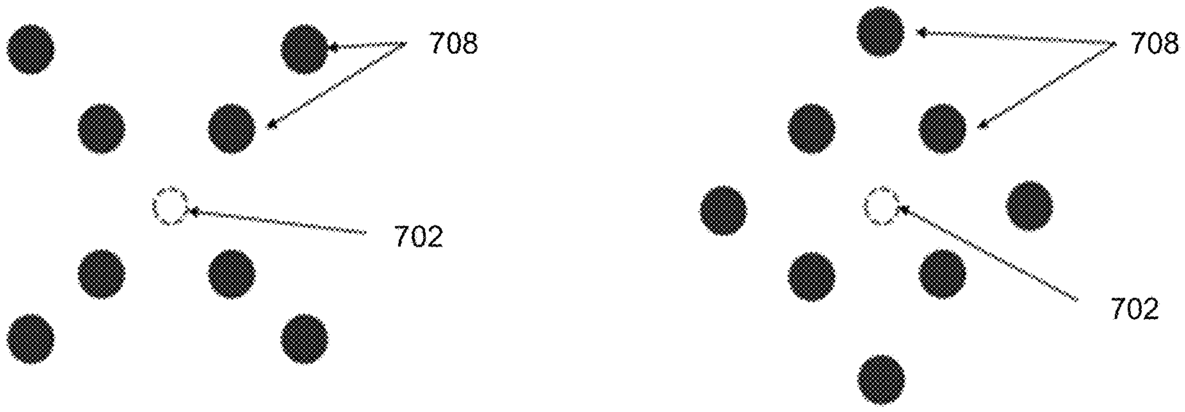
FIG. 7 schematically depicts a top view of two additional arrangements of a dual polarity antenna, in accordance with an example embodiment.

FIG. 7 schematically depicts a top view of two additional arrangements of a dual polarity antenna, in accordance with an example embodiment. Briefly, the arrangements depicted in FIG. 7 expand on the simpler depiction of FIG. 2. Monopoles of the ancillary radiator 708 of the dual polarity antenna 700 correspond to the monopoles 108*a* and 108*b* shown in FIG. 2. As shown in the figure, the monopoles of the ancillary radiator 708 are arranged in a symmetric configuration with respect to a phase centre of the dual polarity radiator 702.

Figure 8:
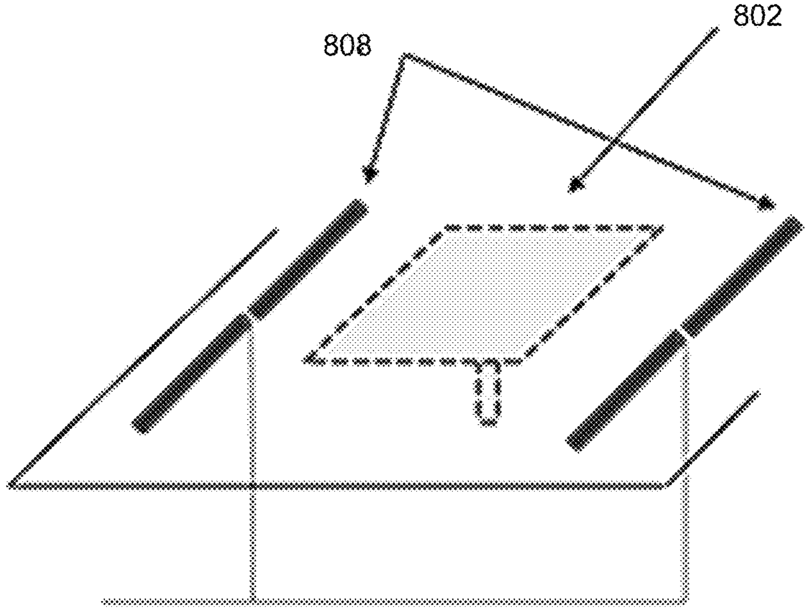
FIG. 8 schematically depicts a dual polarity antenna, in accordance with another embodiment.

FIG. 8 schematically depicts a dual polarity antenna, in accordance with another embodiment. The dual polarity antenna 800 largely corresponds to the dual polarity antenna (s) depicted in the preceding figures. As shown in FIG. 8, the dual polarity radiator 802 may be implemented using a square dipole, with the ancillary radiator 808 also comprising dipoles. It will be appreciated that the radiators described herein may be implemented using any suitable components and/or configurations.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The invention claimed is:

1. A dual polarity antenna, comprising:
- a dual polarity radiator, comprising a first radiator having a first polarity and a second radiator having a second polarity orthogonal to the first polarity;
- an ancillary radiator; and
- a feeding network for feeding a radio-frequency (RF) signal to both the first radiator and the ancillary radiator, driving the first radiator to radiate a wave having a first polarization, causing radiation of a spurious wave having a polarization orthogonal to the first polarization, and driving the ancillary radiator to radiate a wave that cancels the spurious wave at least partly, wherein the feeding network comprises one or more delay elements that delay the RF signal, wherein a phase difference of the RF signal and the delayed RF signal is 180 degrees, wherein:
  - the delayed RF signal is input to the ancillary radiator that is outside the dual polarity radiator, and the RF signal is input to the first radiator that is within the dual polarity radiator; or
  - the RF signal is input to the ancillary radiator that is outside the dual polarity radiator, and the delayed RF signal is input to the first radiator that is within the dual polarity radiator.

2. The dual polarity antenna of claim 1, wherein the feeding network is configured so that the RF signal has a lower amplitude at the ancillary radiator than at the first radiator.

3. The dual polarity antenna of claim 1, wherein the ancillary radiator comprises two or more monopole antennas.

4. The dual polarity antenna of claim 3, wherein the two or more monopole antennas are placed symmetrically with respect to the dual polarity radiator.

5. The dual polarity antenna of claim 1, wherein the ancillary radiator comprises two or more dipole antennas.

6. The dual polarity antenna of claim 5, wherein the two or more dipole antennas are placed symmetrically with respect to the dual polarity radiator.

7. The dual polarity antenna of claim 1, wherein the ancillary radiator is a first ancillary radiator, the feeding network is a first feeding network, and the dual polarity antenna further comprises:
- a second ancillary radiator and a second feeding network, wherein the RF signal is a first RF signal, the spurious wave is a first spurious wave, the second feeding network is configured for feeding a second RF signal to both the second radiator and to the second ancillary radiator, driving the second radiator to radiate a wave having a second polarization, causing generation of a second spurious wave having a polarization orthogonal to the second polarization, and driving the second ancillary radiator to radiate a wave that cancels the second spurious wave at least partly.

8. An antenna array comprising a plurality of dual polarity antennas, wherein each dual polarity antenna of the plurality of dual polarity antennas comprises:
- a dual polarity radiator, comprising a first radiator having a first polarity and a second radiator having a second polarity orthogonal to the first polarity;
- an ancillary radiator; and
- a feeding network for feeding a radio-frequency (RF) signal to both the first radiator and the ancillary radiator, driving the first radiator to radiate a wave having a first polarization, causing radiation of a spurious wave having a polarization orthogonal to the first polarization, and driving the ancillary radiator to radiate a wave that cancels the spurious wave at least partly, wherein the feeding network comprises one or more delay elements that delay the RF signal, wherein a phase difference of the RF signal and the delayed RF signal is 180 degrees, wherein:
  - the delayed RF signal is input to the ancillary radiator that is outside the dual polarity radiator, and the RF signal is input to the first radiator that is within the dual polarity radiator; or
  - the RF signal is input to the ancillary radiator that is outside the dual polarity radiator, and the delayed RF signal is input to the first radiator that is within the dual polarity radiator.

9. The antenna array of claim 8, wherein the plurality of dual polarity antennas forms a massive multiple-input and multiple-output (mMIMO) antenna array.

10. The antenna array of claim 8, wherein the feeding network is configured so that the RF signal has a lower amplitude at the ancillary radiator than at the first radiator.

11. The antenna array of claim 8, wherein the ancillary radiator comprises two or more monopole antennas.

12. The antenna array of claim 11, wherein the two or more monopole antennas are placed symmetrically with respect to the dual polarity radiator.

13. The antenna array of claim 8, wherein the ancillary radiator comprises two or more dipole antennas.

14. The antenna array of claim 13, wherein the two or more dipole antennas are placed symmetrically with respect to the dual polarity radiator.

15. The antenna array of claim 8, wherein the ancillary radiator is a first ancillary radiator, the feeding network is a first feeding network, and the dual polarity antenna further comprises:
- a second ancillary radiator and a second feeding network, wherein the RF signal is a first RF signal, the spurious wave is a first spurious wave, the second feeding network is configured for feeding a second RF signal to both the second radiator and to the second ancillary radiator, driving the second radiator to radiate a wave having a second polarization, causing generation of a second spurious wave having a polarization orthogonal to the second polarization, and driving the second ancillary radiator to radiate a wave that cancels the second spurious wave at least partly.

16. A method of transmitting a radio-frequency (RF) signal, the method comprising:

feeding the RF signal to a first radiator having a first polarity and to a first ancillary radiator, wherein the RF signal is delayed, wherein a phase difference of the RF signal and the delayed RF signal is 180 degrees, wherein:

the delayed RF signal is input to the first ancillary radiator that is outside a dual polarity radiator, and the RF signal is input to the first radiator that is within the dual polarity radiator; or the RF signal is input to the first ancillary radiator that is outside the dual polarity radiator, and the delayed RF signal is input to the first radiator that is within the dual polarity radiator;

driving the first radiator to radiate a wave having a first polarization;

causing radiation of a spurious wave having a polarization orthogonal to the first polarization; and driving the first ancillary radiator to radiate a wave that cancels the spurious wave at least partly.

17. The method of claim 16, wherein the RF signal has a lower amplitude at the first ancillary radiator than at the first radiator.

18. The method of claim 16, further comprising:

feeding a second RF signal to a second radiator having a second polarity and a second ancillary radiator, wherein the RF signal is a first RF signal, and the spurious wave is a first spurious wave;

driving the second radiator to radiate a wave having a second polarization;

causing generation of a second spurious wave having a polarization orthogonal to the second polarization; and driving the second ancillary radiator to radiate a wave that cancels the second spurious wave at least partly.

19. The method according to claim 16, wherein the first ancillary radiator comprises two or more monopole antennas.

20. The method according to claim 16, wherein the first ancillary radiator comprises two or more dipole antennas.

* * * * *